United States Patent [19]

Archer

[11] 4,316,243
[45] Feb. 16, 1982

[54] POWER FET INVERTER DRIVE CIRCUIT

[75] Inventor: William R. Archer, Fort Wayne, Ind.

[73] Assignee: General Electric Company, Salem, Va.

[21] Appl. No.: 104,013

[22] Filed: Dec. 17, 1979

[51] Int. Cl.³ ............... H02M 7/537; H03K 17/687
[52] U.S. Cl. .............................. 363/132; 307/261; 307/570; 307/584
[58] Field of Search .......................... 363/131–132, 363/133, 134, 97, 135, 17; 307/260, 261, 251, 570, 584, 575, 576, 585; 330/269, 262, 300, 264, 277, 207

[56] References Cited
U.S. PATENT DOCUMENTS 4,115,740  9/1978  Yoshida et al. ................. 330/264

FOREIGN PATENT DOCUMENTS 2527172  1/1976  Fed. Rep. of Germany ...... 330/269
668049  6/1979  U.S.S.R. ............................... 363/17

Primary Examiner—Larry N. Anagnos
Attorney, Agent, or Firm—James H. Beusse; Arnold E. Renner

[57] ABSTRACT

A half-bridge inverter having first and second power FETs is provided with a high-speed, highly efficient drive circuit for driving the FETs from a single control signal. A single 15 V supply provides energy for charging the gate electrode of the first FET, as well as for a floating source for charging the gate electrode of the second FET. A single bipolar transistor receives the control signal for controlling operation of the first FET, while a current source, a bipolar transistor in series with a resistor, receives the control signal to effect operation of a third bipolar transistor, thereby to control operation of the second FET.

8 Claims, 1 Drawing Figure

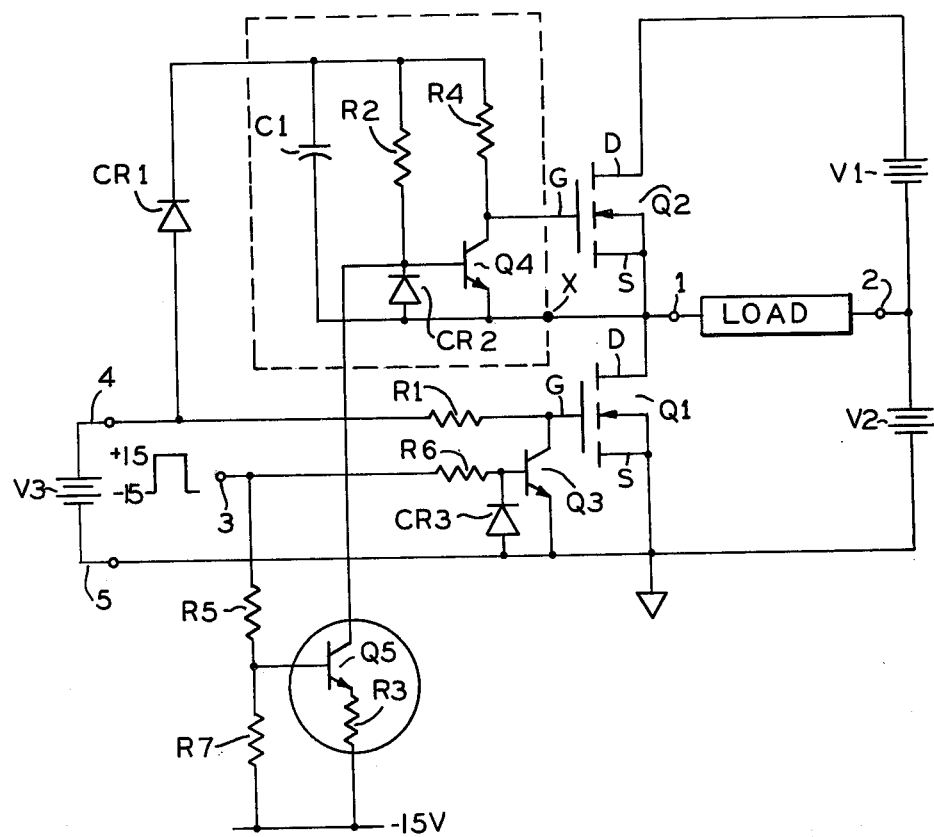

POWER FET INVERTER DRIVE CIRCUIT

BACKGROUND OF THE INVENTION

1. Field of the Invention

The present invention relates to a circuit for driving a pair of power field effect transistors, FETs, and more particularly to a circuit for operating such power FETs which form a half-bridge inverter, the power FETs being of the n-channel, enhancement type, from a single pulse signal.

2. Description of the Prior Art

Many products require conversion from AC power to DC power and there are many and varied forms of circuits and devices to implement this conversion. One form of such a circuit is an inverter which uses semiconductor devices operating as switches. One relatively new type of switching device for use in such inverter circuits is the power field effect transistor, the power FET. The power FET is a semiconductor device which behaves as a variable resistor between two terminals (source and drain) and is controlled by a third terminal (gate). The gate is isolated from the two power terminals by a dielectric film or oxide which causes an inherent capacitor to be formed. For all practical purposes, the response of the main terminal resistance is instantly varied by the electric field established by the gate terminal when a voltage is applied to the gate. This device has some unique operating characteristics which make it particularly suitable for high frequency converters. These characteristics include very high speed and virtually infinite input impedance. Because the power FET is a voltage controlled device, this as compared to a conventional bipolar transistor which is a current controlled device, inverters previously designed using bipolar devices must be significantly modified to take full advantage of the features of the new power FETs.

It is desirable therefore to provide a high effiency, high speed, drive circuit for controlling operation of at least a pair of power FETs in an inverter from a single pulse signal so as also to avoid simultaneous conduction—shoot-through.

Accordingly, it is an object of the present invention to provide a circuit for driving at least a pair of power FETs in an inverter from a single pulse signal such that high efficiency and high speed are accomplished while shoot-through is avoided.

SUMMARY OF THE INVENTION

In carrying out the object of my invention, in one form, there is provided, in an inverter including at least first and second enhancement type n-channel power FETs, means for driving the respective FETs from a single pulse signal. The first and second power FETs each include a gate electrode, a source electrode and a drain electrode, the FETs being connected in push-pull relation such that the drain electrode of the first FET and the source electrode of the second FET are connected in common to an inverter output terminal. The source electrode of the first FET and the drain electrode of the second FET are each arranged for connection to a center-tapped, DC voltage source. The source electrode of the first FET is circuit common, and the inverter output terminal and the center tap of the center-tapped, DC voltage source are adapted for connection to a load. A first switching device is connected across the gate and source electrodes of the first FET and includes a control terminal for receiving the single pulse signal. A first DC voltage source has its high side connected to the gate electrode of the first FET through an impedance and its low side connected to the source electrode of the first FET. A second switching device is connected across the gate and source electrodes of the second FET and includes a control terminal. A second DC voltage source has its high side connected through an impedance to the gate of the second FET and through an impedance to the control terminal of the second switching device and its low side connected to the source of the second FET and through an impedance to the control terminal of the second switching device. A programmable current source is connected between the control terminal of the second switching device and one of circuit common and a voltage negative with respect to circuit common. This programmable current source includes a control terminal for receiving the single pulse signal through an impedance.

BRIEF DESCRIPTION OF THE DRAWING

The accompanying drawing is a detailed schematic representation of the preferred embodiment of the drive circuit of the present invention.

DESCRIPTION OF THE PREFERRED EMBODIMENT

Referring now to the drawing, there is shown a half-bridge inverter for driving a load, the inverter including first and second n-channel, enhancement type, power field effect transistors (FETs) Q1 and Q2, respectively. Each of the power FETs Q1 and Q2 has a gate electrode G, a source electrode S, and a drain electrode D. As can be seen, the power FETs Q1 and Q2 are connected in push-pull relation such that the drain electrode D of the power FET Q1 and the source electrode S of the power FET Q2 are connected in common to an inverter output terminal, indicated as point 1. The source electrode S of the power FET Q1 and the drain electrode D of the power FET Q2 are arranged for connection to a center-tapped DC voltage source made up of sources V1 and V2, respectively. Source electrode S of the first FET Q1 is at circuit common, which in the preferred embodiment is ground potential. The inverter output of terminal 1 and the center tap 2 of the center tapped DC voltage source are adapted for connection to a load as shown.

In accordance with the present invention, there is provided the preferred embodiment of means for driving the respective power FETs Q1 and Q2 from a single pulse signal, a square wave signal, applied to terminal 3. A first switching device, which in this preferred embodiment takes the form of bipolar transistor Q3, is connected across the gate and source electrodes of power FET Q1 such that its emitter is tied to the source electrode of FET Q1 and its collector is connected to the gate electrode of FET Q1. Bipolar transistor Q3 includes a control terminal, in the form of a base electrode, for receiving the single pulse signal from terminal 3 through an impedance, resistor R6.

A first DC voltage source V3, capable of providing plus 15 volts, has its high side 4 connected to the gate electrode G of power FET Q1 through an impedance, resistor R1. The low side 5 of this 15 volt source V3 is connected to circuit common and thereby to the source electrode of power FET Q1. Source V3 serves to provide energy to turn on power FET Q1.

A second switching device, which in this preferred embodiment takes the form of a bipolar transistor Q4, is connected across the gate and source electrodes of the power FET Q2 such that its emitter is tied to the source electrode and its collector is tied to the gate electrode. Bipolar transistor Q4 includes a control terminal in the form of a base electrode.

A second DC voltage source, in the preferred embodiment including a capacitor C1 charged through diode CR1 from the first DC voltage source V3, has its high side connected through an impedance, resistor R4, to the gate electrode G of power FET Q2 and through an impedance, resistor R2, to the base of bipolar transistor Q4. The low side of this second DC voltage source is connected to the source electrode S of the power FET Q2 and through an impedance, diode CR2, to the base of bipolar transistor Q4. This second DC source serves to provide energy to turn on power FET Q2.

A programmable current source, which in the preferred embodiment includes a bipolar transistor Q5 in series with an impedance (resistor R3), is connected in circuit such that the collector of bipolar transistor Q5 is connected to the base of bipolar transistor Q4 and the emitter of bipolar transistor Q5 is connected through resistor R3 to a voltage negative with respect to circuit common. In the preferred embodiment, this negative voltage is a minus 15 volt potential. Of course, it should be realized that resistor R3 could be tied to circuit common. The programmable current source includes a control terminal, the base of transistor Q5, for receiving the single pulse signal from input terminal 3 through an impedance, resistor R5.

Operation of the preferred embodiment circuit of the present invention will now be described. To turn off first power FET Q1, a square wave signal as shown is applied to terminal 3 such that when the square wave is positive, transistor Q3 will turn on thereby discharging the gate-source capacitance of first power FET Q1. FET Q1 then rapidly turns off. When the square wave pulse goes negative, transistor Q3 will turn off which in turn allows resistor R1 to charge first power FET Q1 to the "on" state.

Control of second power FET Q2 is, however, more difficult because its source electrode S is not at ground potential as is the case with FET Q1 and indeed FET Q2 switches from a voltage (V1 plus V2) to approximately ground as FETs Q1 and Q2 turn on and off. A separate or floating DC voltage source is therefore needed to drive second power FET Q2 and such is provided in the form of capacitor C1 which is charged from the plus 15 volt source V3 through a diode CR1.

A negative polarity on the single pulse signal will turn transistor Q5 off (at the same time turning off transistor Q3) which in turn will force transistor Q4 to be biased in the "on" state by resistor R2. Second power FET Q2 is therefore turned off. Point X, the common point of the source electrode of second FET Q2 and the drain electrode of first FET Q1, is now approximately at circuit common: that is, ground potential. Such allows diode CR1 to conduct, causing capacitor C1 to charge to plus 15 volts from first DC voltage source V3.

A positive polarity on the single pulse signal at terminal 3 causes transistor Q5 to turn on (at the same time turning on transistor Q3). This removes base drive from transistor Q4 via resistor R2. Transistor Q4 therefore turns off, and very quickly, due to the reverse biasing effect of transistor Q5. This in turn allows capacitor C1 to charge the gate of second power FET Q2 to the "on" state via resistor R4. As second FET Q2 turns on, point X will rise rapidly from circuit common, ground potential, to the supply voltage: approximately V1 plus V2. Because of the diode CR1 however, the circuit contained within the dotted lines is disconnected from the ground referenced plus 15 volt supply V3 and "floats" to the potential of point X.

Capacitor C1 is chosen so as to supply sufficient energy to the resistor R2-transistor Q4 circuit to maintain second power FET Q2 in the "on" state for the maximum required time. This is relatively easy because the only current discharging capacitor C1 is that which flows through resistor R2 and transistor Q5, somewhere on the order of tens of milliamps. Turning transistor Q5 off will quickly drive transistor Q4 on thereby turning second FET Q2 off. It should be noted here that diode CR2 keeps the collector-base capacitance of transistor Q5 from discharging during its "on" time. The net effect is that the switching of transistor Q5 is speeded up and such is one of the keys to producing an efficient, high-speed, switching inverter.

First DC voltage source V3 may be arranged in circuit such that its high side 4 is connected to the drain electrode D of power FET Q2 or to the center tap 2 of the center-tapped DC voltage source made up of sources V1 and V2. Such may be the case whether the second DC voltage source including capacitor C1 is charged from source V3 through diode CR1 or whether an independent source is provided. Appropriate changes in the values of DC sources V1 and V2 are necessary, and will be obvious to those skilled in the art.

Of course, another key to the proper operation of a half-bridge inverter is the prevention of simultaneous conduction of the two power switching devices, here first FET Q1 and second FET Q2. What I have shown is a high-speed, very efficient drive circuit for operating a pair of power FETs functioning in a half-bridge inverter with one single pulse signal being used to control both power FETs, while virtually eliminating any chance for uncontrolled, simultaneous conduction of the two FETs.

The inverter control circuit shown in the drawing has been constructed and has operated satisfactorily with components having the following values and/or designations:

| Components | | Values/Designations |
| --- | --- | --- |
| Power FET | Q1, Q2 | Siliconix VN-86HF |
| Center-tapped DC voltage source | V1 & V2 | approx. 30V each |
| Bipolar Transistors | Q3 Q4 Q5 | 2N 3903 |
| Capacitors | C1, C2 | 4.7uF, 35V |
| Resistors | R1 | 1K ½w |
| | R2 | 3.3K ½w |
| | R3 R4 | 1K ½w |
| | R5 R6 | 3.3K ½w |
| | R7 | 820 Ohm ½w |

While an embodiment of this invention has been shown and described, it will be apparent to those skilled in the art that modifications are possible without departing from the inventive concepts herein described. For example, any or all the bipolar devices may be replaced by appropriate FET's.

In accordance with the Patent Statutes, changes may be made in the disclosed circuit and manner in which it is used without actually departing from the true spirit and scope of this invention.

What is claimed is:

1. In an inverter including at least first and second enhancement type, N-channel power FETs, each FET having a gate electrode, a source electrode, and a drain electrode, the first and second FETs being connected in push-pull relation such that the drain electrode of the first FET and the source electrode of the second FET are connected in common to an inverter output terminal; the source electrode of the first FET and the drain electrode of the second FET each connected to a respective end terminal of a center-tapped DC voltage source, the source electrode of the first FET being circuit common, the inverter output terminal and the center tap of the center-tapped DC voltage source being adapted for connection to a load, means for driving the respective FETs from a single pulse signal, comprising:

a first switching device connected across the gate and source electrodes of the first FET, and including a control terminal for receiving the single pulse signal;

a first DC voltage source for providing energy to turn on the first FET, the first DC voltage source having its high side connected to the gate electrode of the first FET through an impedance and its low side connected to the source electrode of the first FET;

a second switching device connected across the gate and source electrodes of the second FET, and including a control terminal;

a second DC voltage source for providing energy to turn on the second FET, the second DC voltage source having its high side connected through an impedance to the gate of the second FET and through an impedance to the control terminal of the second switching device and its low side connected to the source of the second FET and through an impedance to the control terminal of the second switching device; and a programmable current source connected between the control terminal of the second switching device and one of circuit common and a voltage negative with respect to circuit common, the programmable current source including a control terminal for receiving the single pulse signal through an impedance.

2. The invention of claim 1 wherein the second DC voltage source includes a capacitance chargeable through a diode connected to the first DC voltage source.

3. The invention of claim 1 wherein the first and second switching devices are first and second bipolar transistors.

4. The invention of claim 3 wherein the first and second bipolar transistors are of the NPN type, each including a collector electrode, an emitter electrode, and a base electrode serving as a control electrode.

5. The invention of claim 4 wherein the collector electrodes of the first and second bipolar transistors are connected respectively to the gate electrodes of the first and second FETs, and the emitter electrodes of the first and second bipolar transistors are connected respectively to the source electrodes of the first and second FETs.

6. The invention of claim 1 wherein the programmable current source includes a bipolar transistor.

7. The invention of claim 6 wherein the bipolar transistor is of the NPN type and includes: a collector electrode connected to the control terminal of the second switching device; an emitter electrode; and a base electrode for receiving the single pulse signal.

8. The invention of claim 7 wherein the emitter electrode is connected through an impedance to a voltage negative with respect to circuit common.

* * * * *